United States Patent [19]
Hagen et al.

[11] 3,890,598
[45] June 17, 1975

[54] OPTICAL SIGNAL PROCESSOR

[75] Inventors: William B. Hagen, Northridge; Morton Rudin, Gardena, both of Calif.

[73] Assignee: TRW Inc., Redondo Beach, Calif.

[22] Filed: Oct. 26, 1970

[21] Appl. No.: 84,064

[52] U.S. Cl. ............... 340/6 R; 340/16 R; 343/5 R
[51] Int. Cl. ............................................. G01s 3/80
[58] Field of Search ............ 340/5 R, 6 R, 15.5 VD, 340/16 R; 343/100 CL; 350/162 R, 162 SF

[56] References Cited
UNITED STATES PATENTS

| | | | |
|---|---|---|---|
| 3,409,872 | 11/1968 | Hogg et al.................... | 340/15.5 R |
| 3,612,658 | 10/1971 | Slaymaker................... | 350/162 SF |

*Primary Examiner*—Richard A. Farley
*Attorney, Agent, or Firm*—Daniel T. Anderson; Harry I. Jacobs

[57] ABSTRACT

An optical signal processor operates upon the outputs of a plurality of transducers. The transducers may comprise a radar antenna array or an underwater sonar antenna array. The processor receives the signals from each transducer and combines them optically to derive the location of a target.

3 Claims, 7 Drawing Figures

William B. Hagen
Morton Rudin
ATTORNEY

OPTICAL SIGNAL PROCESSOR

BACKGROUND OF THE INVENTION

Many target tracking systems in use today utilize a plurality of receivers, each one gathering target information. By operating collectively upon the receiver outputs, the location of the target can be determined. The operations of beam forming and frequency analysis are utilized.

One passive system currently in use to detect and track underwater vehicles employs a beam forming and frequency analysis concept wherein the time history of the frequency analysis (lofargram) of acoustic radiation from underwater or surface targets is electromechanically processed to derive target information. A large area of the ocean is searched with beams formed from the signals received by an underwater antenna array comprising a plurality of hydrophones. The individual signals received from the hydrophones are delayed relative to one another and then summed to yield the energy received from a specific direction in the ocean.

A rotating drum mechanical beamformer performs this time shift and sum processes each beam to output a separate voltage for each beam. This process is called beamforming. The beamformed signals are then quantized to two levels, to yield binary signals which are frequency analyzed by a plurality of digital spectrum analyzers.

The resulting beamformed, frequency decomposed signals are then routed to a plurality of chart recorders, one for each hydrophone, which present the information as lofargrams.

Various attempts have been made to optically process the signals received from the hydrophones to eliminate the need for mechanical beamformers and frequency analyzers.

Early optical processors, such as those developed by the U.S. Navy Underwater Sound Laboratory in San Diego were limited in that they did not operate continuously in time, and they heterodyned the signal. A heterodyned signal, if operated continuously, would use an enormous amount of film.

It would be desirable to continuously, simultaneously process the data received from a plurality of hydrophones by optical means without heterodyning the signals.

SUMMARY

In accordance with an example of a preferred embodiment of the present invention, the signals received from a plurality of hydrophones are used to modulate a scanning laser beam. The modulated laser beam exposes a strip of film that continuously runs past the laser beam. The film is then developed.

The image on the developed film is projected, using a laser light source, through a lens which focuses the Fourier transform of the film on an optical sensor.

The optical images are further processed by a readout module including a rotating reticle, a translating reticle and a plurality of photoconductors. The outputs of the photoconductors are used to drive a plurality of chart recorders.

DESCRIPTION OF THE PREFERRED EMBODIMENTS

The operation of the optical processing system can be explained with reference to FIG. 1. Target and noise information are gathered by a hydrophone array 10 comprising a plurality of spaced hydrophones 11. The target and noise information is transferred over lines 12 to a plurality of input transducers 13 which convert the signals received from array 10 into a two-dimensional spatial modulation of the beam from a laser.

Figure 1:
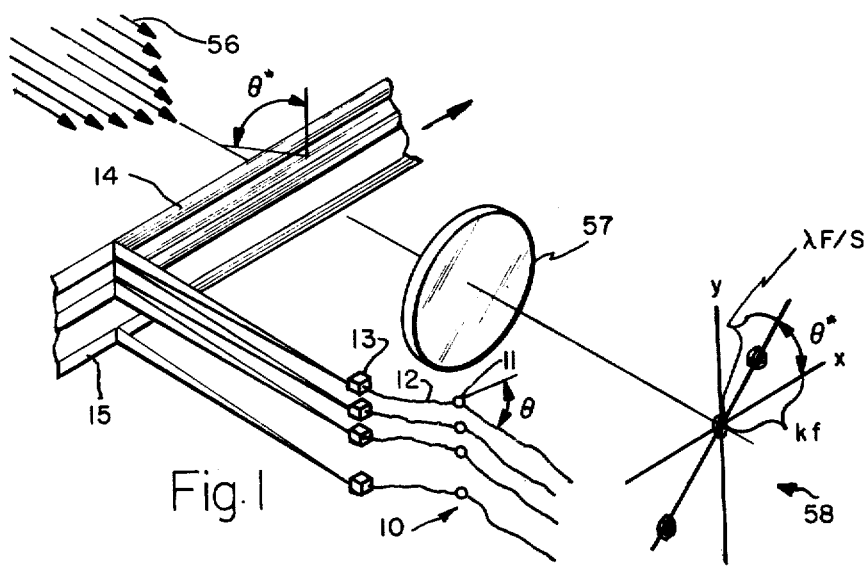
FIG. 1 is a schematic of an example of an optical signal processor according to the present invention.
Figure 2:
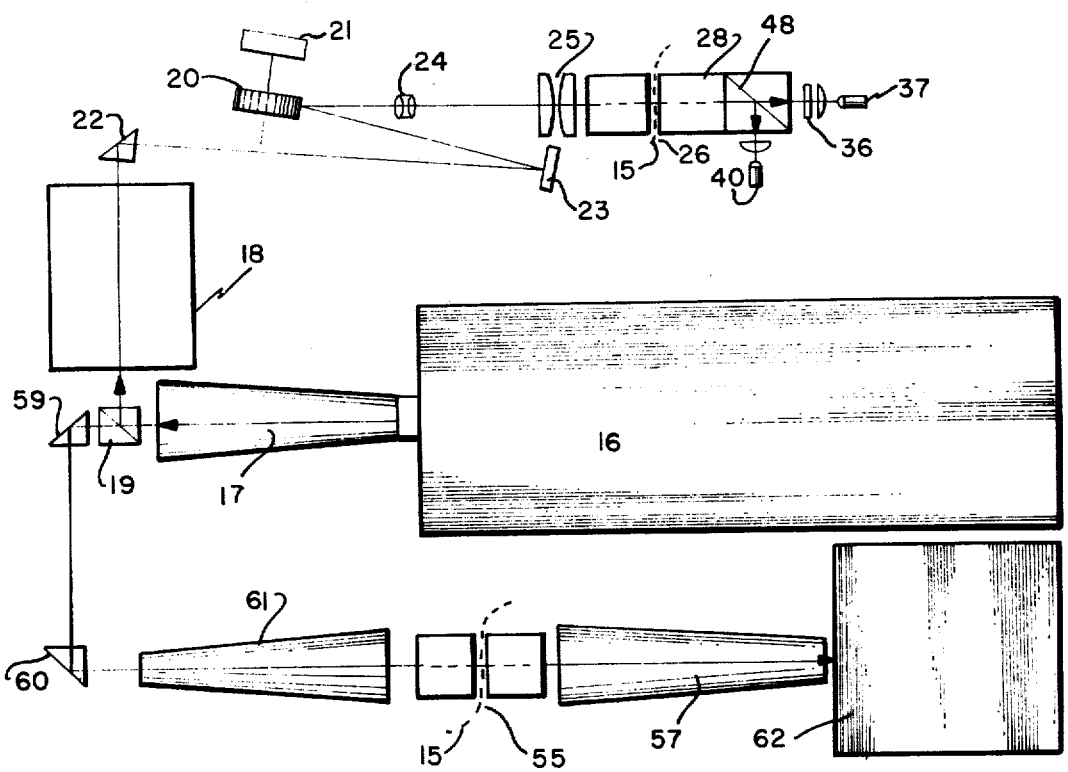
FIG. 2 is a block diagram of the optical signal processor shown in FIG. 1.
Figure 3:
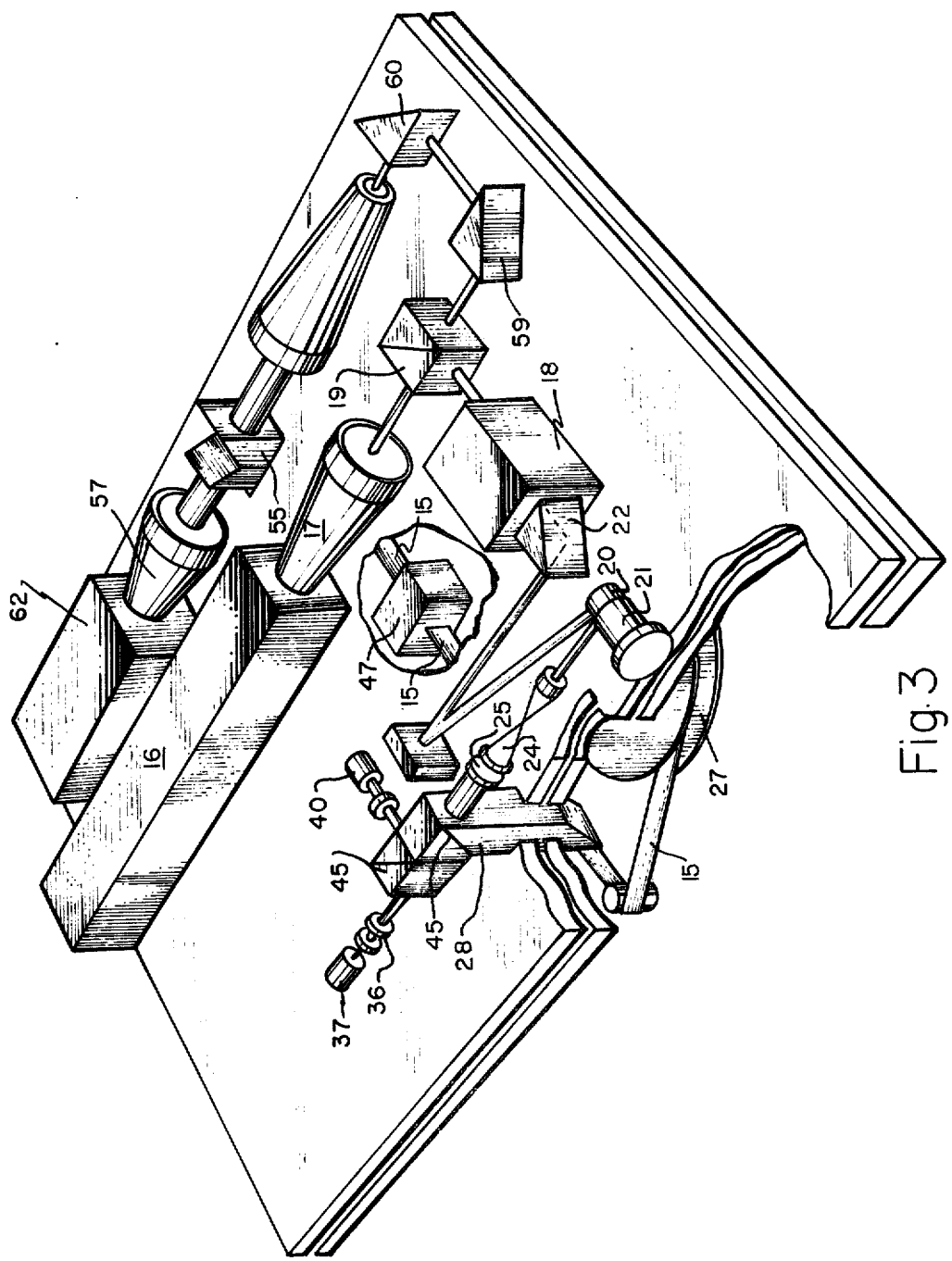
FIG. 3 is a plan view of the optical signal processor shown in FIG. 1.

Referring to FIGS. 2 and 3, the components used to form the conversion of hydrophone signals into two-dimensional spatial modulation are shown in detail. The conversion is accomplished by creating a signal mask 14 on a moving strip of film 15 shown in FIG. 1.

The film is exposed by scanning a focused spot of laser illumination onto the film. The distance across the film is proportional to distance along the hydrophone array, whereas the distance along the film is proportional to time. A laser 16 generates a beam of monochromatic spatially coherent light. The light generated by the laser passes through a beam expander and spatial filter 17 to a pockels cell modulator 18 via a beam splitter 19. Modulator 18 varies the light intensity of the laser in response to the signals received from hydrophone array 10.

FIG. 1 shows a plurality of transducers 13, one for each hydrophone 11 of array 10. In accordance with the embodiment of the invention shown in FIGS. 2 and 3, one transducer is used in conjunction with a scanning means rather than multiple transducers. The output of modulator 18 is caused to scan across film 15 by a multi-sided scanning mirror 20. An encoding system including an encoder 21 is used to connect the correct hydrophone with modulator 18 as mirror 20 causes the spot to move across the film so that the output of each hydrophone is recorded along a separate "track" along film 15. A constant film velocity separates these cross-film scans. The fact that mirror 20 is multi-sided operates to "break" the signal on film 15 as it scans.

The light emanating from modulator 18 is directed to mirror 20 via a prism 22 and a plane mirror 23. The light from mirror 20 is directed onto film 15 via a series of lenses 24 and 25 and then into film gate 26, which may be a liquid film gate to prevent index of refraction problems, and having one side triangularly shaded, i.e., more dense towards edges.

As shown in FIG. 3, film 15 may be stored on film supply reel 27. The film drive means will be explained below. A periscope prism 28 may be used to transfer the image to the film.

Figure 4:
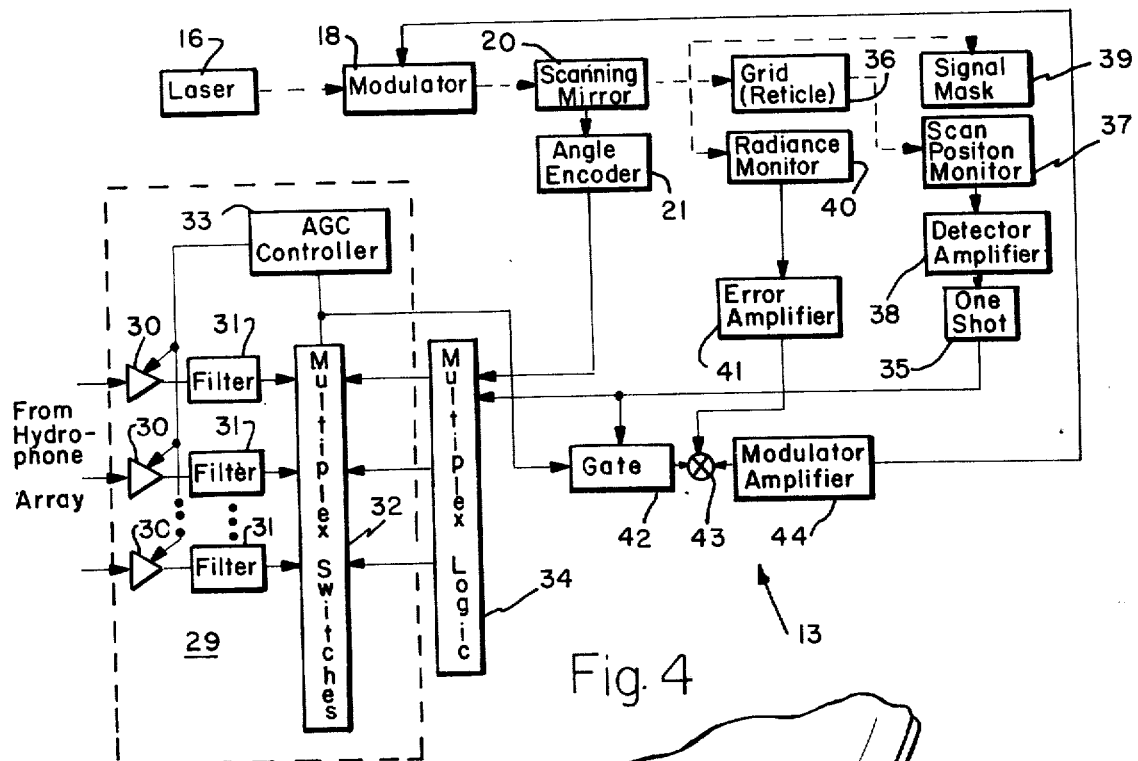
FIG. 4 is a block diagram of the input transducer electronics of the optical signal processor.

A block diagram of the input transducer electronics 13 is shown in FIG. 4. The input signal processor 29 of transducer 13 comprises a plurality of preamplifiers 30, filter 31 and multiplex switches 32, one of each for every hydrophone 11 in array 10. Signal processor 29 accomplishes two functions: multiplexing the signals from the hydrophones into a single time shared signal, and normalizing the average signal level by adjusting the gain with an automatic gain control 33 having a time constant much longer than the information time constants.

Two approaches to performing these two functions could be utilized. The first approach would provide each hydrophone channel with an automatic gain control followed by a preamplifier. The second approach would use a multiplexer, having wide dynamic range, followed by a single automatic gain control amplifier. The preferred embodiment of the present invention discussed herein uses the first approach.

The output of each preamplifier 30 is filtered by a filter 31. Filters 31 remove a high frequency carrier which is introduced by a pulse width modulator in automatic gain control 33, and remove higher frequency signal components to reduce the effects of "aliasing" distortion resulting from multiplexer sampling. Each filter may comprise a single pole low-pass RC filter.

Multiplex switches 32 consist of a plurality of transistors operating in their switching mode. The switches normalize the gain of the input from the hydrophones via automatic gain controller 33.

Automatic gain controller 33 may comprise a signal rectifier, clock, a long-time constant filter, and a pulse width modulator. The output of each multiplex switch is rectified using an operational amplifier feedback rectifier for linearity and filtered with a low-pass filter having the desired long-time constant. The resulting direct current voltage is used to control the pulse duty cycle in the pulse width modulator which may consist of an integrator, reset switch, level detector and flip-flop. Prior to a clock pulse the integrator is reset. The input direct current voltage is then integrated until it crosses the level detector switching point, thereby resetting the flip-flop and the integrator until the next clock-pulse. The duty cycle of the flip-flop is then inversely proportional to the direct current input voltage.

A multiplex logic 34 determines and applies the control switching signals to multiplex switches 32. The multiplex logic 34 may consist of a multi-bit shift register having one bit for each hydrophone 11 in array 10. A signal from shaft angle encoder 21 sets the first digit of the register to binary one and the remaining digits to binary zero. At each output from one shot 35, the register shifts one place. A parallel output is required from the shift register, with one digit stage being connected to each of the switches of multiplex switch 32. An example of a shift register capable of performing the above functions is the General Instrument Corporation Type 3012 SP integrated circuit.

Multi-sided scanning mirror 20 includes a motor which rotates it at the desired speed. Angle encoder 21 digitally determines the shaft position. A grid or recticle 36 permits a scan position monitor 37 to determine the position of the spot reflected from scanning mirror 20. The scan position monitor 37 may consist of a first silicon photodetector. A detector amplifier 38 amplifies the output of scan position monitor 37 to trigger one shot 35.

A signal mask 39 is used in conjunction with a second silicon detector or radiance monitor 40 to monitor the total irradiance. The error signal from radiance monitor 40 is amplified by error amplifier 41.

A gate 42 transmits the multiplexed information during the appropriate portion of the scan as determined by the output of one shot 35. Gate 42 may be a transistorized bidirectional single-pole double throw switch, alternately switching between ground and the output of multiplex switch 32.

A mixer 43 mixes the outputs of error amplifier 41 and gate 42.

A modulator amplifier 44 amplifies the output of mixer 43 and applies it to modulator 18, which may be a pockels cell light modulator.

Referring to FIGS. 2 and 3, the control module for sensing the laser spot will be explained. The control module consists of scanning mirror 20, encoder 21, eye lens 24, collimating and focusing objective 25, film gate 26, a periscope 45, a beam splitter 46, recticle 36, position monitor or detector 37, and intensity detector or radiance monitor 40.

The sampled signal information impressed on the laser beam by modulator 18 emerges therefrom and is directed onto rotating mirror 20. Thereafter the scanning beam is focused and directed into periscope prism 28. A first beamsplitter 45, having low reflectance and located in the top portion of the periscope, allows the major portion of the light to be transmitted to a second beamsplitter 46. The remainder of the light split off by beamsplitter 45 is used to expose film 15 located within film gate 26.

The second beamsplitter 46 directs half the light through a field lens to intensity detector or radiance monitor 40. Intensity detector 40 may be a silicon photodetector. The other beam from beamsplitter 46 is focused onto reticle 36 which consists of opaque and transparent parallel bars. As the beam is scanned across recticle 36 (and simultaneously across the film), a threshold output of position detector or scan position monitor 37, positioned behind the beam, provides a control signal via one shot 35 for multiplex logic 34. Thus, when the reticle transmits a spot of light, the beam is in a position to record a signal sample on the film.

The position sensing reticle 36 may be fabricated by photoetching, i.e., a photo-reduced mask is drawn after probe calibration data becomes available. This position sensing recticle "adjusts" probe positions after deployment with very stable resulting calibration that will not shift with time.

The field lenses may be identical single element units which image the exit pupil of the scanner lens onto the proper photodetectors.

Figure 5:
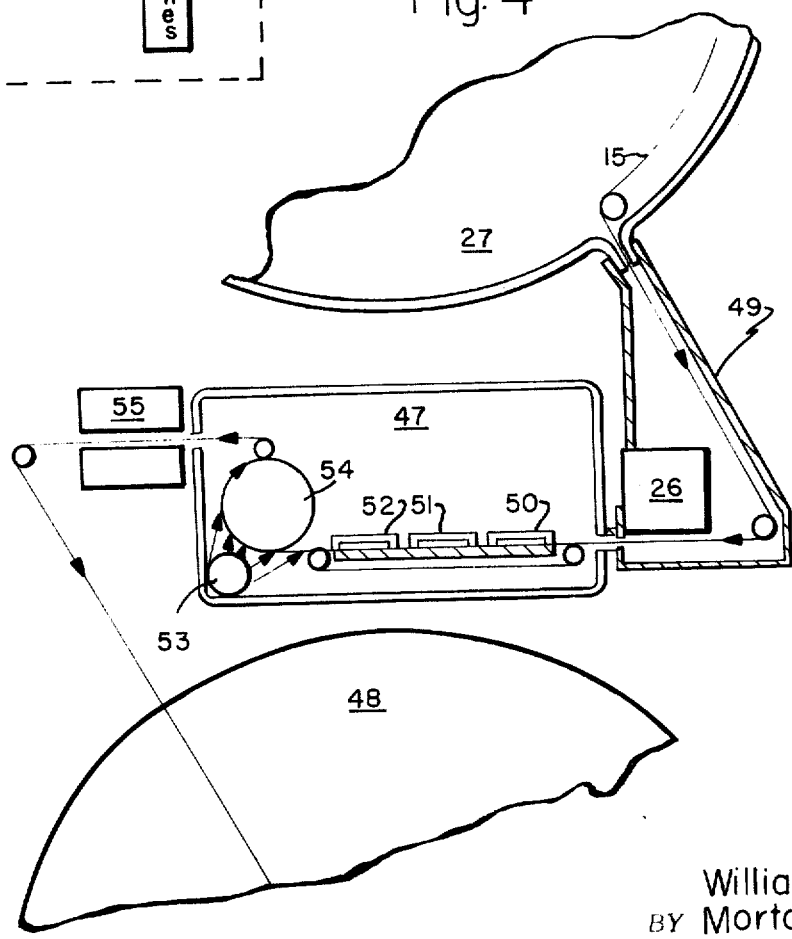
FIG. 5 is a schematic of the film transport means used by the optical signal processor.

After the multiplexed information is written on film 15, a drive capstan 54 pulls the film through a developing tank 47 to a take-up reel 48, as shown in FIG. 5.

FIG. 5 shows a schematic of the film transport means. Capstan 54 is driven at a constant speed to insure that film 15 passes through film gate 26 at a constant speed. Film 15 passes into a light tight tunnel 49 as it is drawn from supply reel 27. After passing through film gate 26, film 15 passes into developing tank 47.

Developing tank 47 contains a relatively fast set of processing chemicals including a developer 50, cleaning solution 51 and rinse solution 52. A dryer 53 dries the film as it passes over drive capstan 54.

The developed film next passes through a second film gate 55 and then to take up reel 48. Film gates 26 and 55 may be of the liquid type to eliminate problems of mismatching refractive indices. A Mark Systems brand Model 1290 rapid film processor is suitable for use as the film transport means.

As shown in FIG. 3, the film transport is conveniently located in a separate plane from the optics and associated electronics. This simplifies the design of the light tight tunnel 49 needed to prevent premature exposure of the film.

The optical processor or reader of the developed film will now be discussed. The basic design of the optical processor is shown in FIG. 1. The signals from hydrophones 11 are transformed into transmittance or density variations on signal mask 14. The main beam from the laser source is expanded, filtered and collimated, resulting in a coherent beam of uniform cross sectional itensity 56 that strikes the signal mask. The light amplitude transmitted by the mask is spatially modulated. A transform lens 57 operates on this diffracted light to yield, at the focal plane of the transform lens a light intensity distribution in output plane 58 which corresponds to the spatial decomposition of the acoustic energy for each of the hydrophones.

Figure 6:
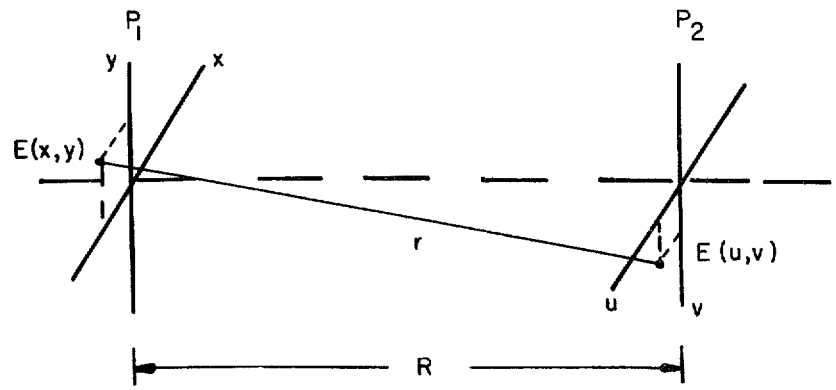
FIG. 6 is used in explaining the spatial Fourier transform capability of the transform lens of the otpical signal processor.

To explain the Fourier transform capability of lens 57, reference is made to FIG. 6. Let the electric field of a light wave at input plane P, be described by $E(x,y)$. Then the electric field at a given point $(u,v)$ in output plane $P_2$ can be calculated from Huygen's principle:

$$E(u,v) = C \iint_{aperture} \frac{E(x,y) e^{[jkr]}}{r} dxdy$$

where $r$ is the distance between point $(x,y)$ and point $(u,v)$ and is approximately equal to $R$, the distance between the two planes; $k$ is equal to $2\pi/80$ where $\lambda$ is the wavelength of the light. Under the approximation that point $(u,v)$ is far from point $(x,y)$, i.e., that $r >> u, v, x, y$, the exponential term reduces to the kernel required for a Fourier integral. Thus, the electric field in the output plane is given by:

$$E(u,v) \approx \frac{C}{R} \iint E(x,y) e^{\left[\frac{-ik}{R}(ux+vy)\right]} dxdy$$

which is simply the expression for the Fourier transform of the electric field at the input plane.

The light amplitude transmitted through plane $P_1$ forms a far field diffraction pattern at infinity. Inserting a lens to the right of plane $P_1$ brings this diffraction pattern to the "right" focal plane of the lens. Thus the lens satisfies the necessary ($r >> x, y, u, v$) in a practical length.

The output of lens 57 is a bow tie display 58 wherein the horizontal axis X is proportional to acoustic frequency ($kf$) received by the hydrophones, and the intensity of light along this axis is proportional to the signal received on the broadside beam. See FIG. 1. Both identical first-order diffraction patterns occur. The maximum half angle $\theta$ of the bow tie defines a line along with the signal spectrum from the largest beam looking angle appears.

As shown in FIG. 6, a plane wave, arriving at angle $\theta$ with respect to the broadside direction, is sensed with a progressive time delay given by:

$$t = \frac{d_i}{c} \sin \theta$$

where $d_i$ is the hydrophone spacing, which may or may not be a constant, and $c$ is the acoustic wavefront velocity.

The signal mask 14, located at the input plane to the optical processor (details of which will be described below), is a continuously moving film 15 containing the appropriately scaled spatial replicas of the outputs of all the hydrophones. Since the channel spacing in the vertical ($y$) direction is proportional to the hydrophone spacing in the array $$y = \beta d_i$$

where $\beta$ is a constant scale factor. If the constant film velocity is $v_T$, then the spatial dimension $x$ is related to time by $$x = v_T t.$$

The signal information from each hydrophone is thus recorded in the appropriate channel on the signal mask. The data symbolically represents the signal amplitude peaks on a particular channel. The spatial wavelength $S_r$ is related to the acoustic period $\tau$ by the film transport velocity $$S_r = v_T \tau$$

or the acoustic frequency $f$ by $$S_r = \frac{v_T}{f}.$$

The angle $\theta^*$, formed by the $y$-axis and a line drawn through a set of wavecrests, is related to the beam angle $\theta$ by the expression $$\tan \theta^* = \frac{x}{y}$$

or $$\tan \theta^* = \frac{v_T}{c\beta} \sin \theta.$$

In addition, the perpendicular distance $s$ between successive wavecrests on the film may be expressed as $$s = s_r \cos \theta^*$$

or $$s = \frac{v_T}{f} \cos \theta^*.$$

One may consider the signal mask 14 as a diffraction grating oriented at angle $\theta^*$ with respect to the $y$-axis.

If this grating is illuminated with collimated coherent light, the first order diffraction pattern appears at infinity. When lens 57 is placed between the signal mask and infinity, the diffraction pattern appears at the focal plane 58 of the lens, in other words, the lens has performed the two-dimensional Fourier transform of the spatial light amplitude transmitted by the signal mask.

The intensity distribution in the output plane 58 is related to the energy at particular spatial frequencies on signal mask 14. A spot of light corresponding to the average light intensity appears at the origin. Two first order spots are on a line angled $\theta^*$ from the $x$-axis and a distance $\lambda F/s$ from the origin. With $\lambda$ the wavelength of the light and $F$ the focal length of the lens, the distance along the $x$-axis is shown to be proportional to the acoustic frequency $f$ by $$X = \frac{\lambda F}{s} \cos \theta^*$$

or $$X = \frac{\lambda F}{v_r} f.$$

Finally, since the angle $\theta^*$ in output plane 58 is related to the beam angle $\theta$, the spectrum on each beam is displayed in the output plane.

The images on the focal plane 58 are mechanically scanned to provide suitable electrical signal sequencing to a plurality of chart recorders. The mechanical scanner may include two scanning slits wherein instantaneous overlapping of clear areas determines the instantaneous scan aperture. One slit may be a rotating disc with five radial slits; and the other may be a translating retical containing a single slit.

The light signals traversing both slits are detected by a photomultiplier tube. Then, after being amplified and commutated to separate signals on each beam, the light signals are distributed to the plurality of chart recorders. The mechanical scanner will be explained later with reference to FIG. 7.

A block diagram and plan view of the optical processor are shown in FIGS. 2 and 3 respectively. Referring to FIGS. 2 and 3, beam splitter 19 directs one-half the light emanating from beam expander 17 onto prisms 59 and 60 which direct the beam of monochromatic spatially coherent light onto beam expanding telescope 61.

Telescope 61 directs the beam of coherent light 56 to pass through film gate 55 and thence to transform lens 57 to readout module 62.

Readout module 62 includes a scanner which mechanically scans a small aperture over the output 58 region of interest to provide suitable signal sequencing. The two positional degrees of freedom required are provided by two scanning slits whose instantaneous, overlapping clear areas determine the instantaneous aperture. The particular trapezoidal geometry of the output image is scanned by a rotating disc 63 centered at the point where the trapezoid sides, if extended, would meet, and by a translating slit 65 moving in the frequency direction, as shown in FIG. 7.

Figure 7:
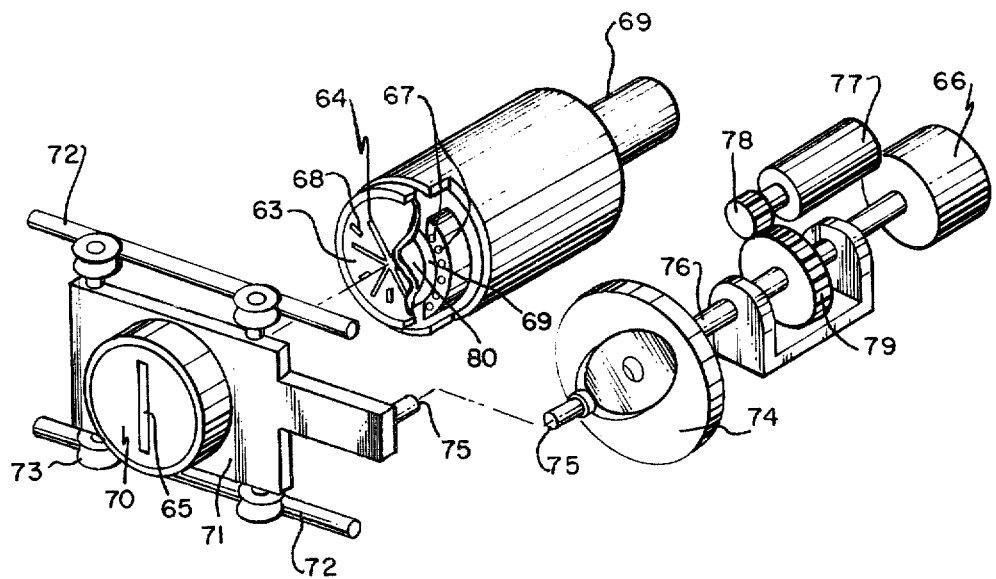
FIG. 7 is a plan view, partially cutaway, of the readout module of the optical processor.

Referring to FIG. 7, the rotating reticle assembly includes rotating disc 63 which may have five slits 64 as shown. The slits are formed of parallel rather than radial lines to avoid creating a frequency — dependent gain distortion due to varying aperture area.

The translating reticle assembly is also shown in FIG. 7. A single translating slit 65 traverses the output image 57 at a nominally constant rate, and returns to prepare for the next cycle. Slit position is sensed via an absolute digital shaft encoder 66, and the encoder output signal is used for driving the recording pen on the chart recorders and for blanking the output signal during the slit flyback time. If necessary, the encoder output may be easily converted to analog form for the chart recorder driver.

The rotating disc reticle 63 turns at a constant velocity. Each rotary slit scan represents sequential sampling of all the beams in output plane 58 at the frequency represented by the translating slit position at that time.

The light traversing slits 64 and 65 is collected by a field lens which focuses the exit pupil of tranform lens 57 onto the photocathode of a photomultiplier tube 80. After amplification, the signal is commutated so that each beam may be matched with the drive to the proper chart recorder.

The commutation is performed optically using an array of photoconductors 67 masked from a light source by the outer rim of the rotating disc 63 except for narrow commutation slits 68 which sequentially illuminate each photoconductor. Each photoconductor of array 67 is illuminated when commutation slit 68 lies over the appropriate beam direction, thus turning the photoconductor "on." The output of photomultiplier 80 is connected to one end of each of the photoconductors 67. The other end is connected to the appropriate "beam" chart recorder. A holding capacitor may be employed to hold each signal sample until the next sampling interval. Each beam represents a hydrophone — chart recorder pair.

Rotating reticle 63 may comprise a glass disc coated on one surface with an opaque thin metal film. Radial slits are etched through the metal film to provide the scanning slits 64. Opposite each scanning slit 64 is a short radial commutation slit 68 which starts at a larger radius than the extant of the scanning slit. The reticle may be mounted on the end of a tubular shaft wherein hydrodynamic gas bearings provide the radial and axial restraints. An induction motor (not shown) may be used to drive the reticle.

An inner stationary tube 69 is provided coaxial with the rotating tubular shaft to provide separation of the scanning and commutating functions. Attached to the outside diameter of the tube is the array of photoconductors 67. The photoconductor array is located adjacent to the inner surface of the reticle disc. In line with the reticle commutator slits 68 and the photoconductor array 67, on the outside end of the rotating assembly, are a lamp, lens and appropriate light shields to operate the optical commutator.

The translating reticle includes an oscillating slit 65 in a glass plate 70 with an opaque metal film on the surface adjacent to the rotating slit disc 63. Glass plate 70 is mounted in a light weight holder 71 which traverses on two ground, round rods 72 that are parallel to each other and to the surface of the rotating reticle. Holder 71 traverses rods 72 with the aid of rollers 73.

A grooved, hardened and ground plate cam 74, designed to give the desired movement for scanning and returning the slit 65 for the next scan, drives the slit holder 71 via a bar 75. The cam, 74 is mounted on the end of a shaft 76, which is driven by a motor 77 via gears 78 and 79.

Optical shaft encoder 66 is attached to the other end of the shaft 16. The encoder 66 signal positions the chart recorders with the oscillating slit 65 and blanks the optical signal coming through the junction of radial slit 64 and oscillating slit 65 during the return of slit 65 after a scan.

After the light sample passes through the aperture formed by slits 64 and 65, it enters photomultiplier 80 for amplification and distribution to the proper chart recorder.

Thus the optical processor described above completely replaces mechanical systems now in use. The location of a target can be determined from the chart recorder outputs in the same manner as from a conventional processor.

We claim:

1. An optical processor for processing the output signals of a hydrophone array comprising:
   a first source of monochromatic spatially coherent light;
   means for modulating the output of said first source of monochromatic spatially coherent light with the output signals of said hydrophone array;
   a photosensitive film strip;
   means for exposing said film with said modulated first source of monochromatic spatially coherent light including an optical encoder;
   said optical encoder causing the film to be exposed so that the output of each hydrophone in the array is recorded along a separate track on said film;
   means for developing said exposed film;
   means for illuminating said developed film with a second source of monochromatic spatially coherent light;
   means for projecting the image on said film illuminated by said second source of monochromatic spatially coherent light through a fourier transform lens to obtain the fourier transform of said images;
   means for optically detecting said fourier transform of said images; and
   means for commutating said detected image to separate the detected signals into a plurality of separate electrical signals, each signal corresponding to the output of a single hydrophone; whereby further processing of said separate electrical signals may be accomplished.

2. The optical processor claimed in claim 1 wherein said optical encoder includes:
   a multi-sided scanning mirror;
   said scanning mirror being rotated; so that as the mirror rotates the output of said modulating means exposes a separate track along the film, each separate track corresponding to the modulated output of a separate hydrophone.

3. The optical processor claimed in claim 1 wherein the means for optically detecting said fourier transform and the means for commutating said detected images comprises:
   a plurality of photoconductors in a circular array;
   a photomultiplier filling the center of said circular photoconductor array;
   a rotating circular reticle disposed between said transform lens and said photodetectors;
   said rotating circular reticle comprising;
      a plurality of rotating slits radially extending from the center of said reticle to a radius slightly smaller than the radius of said photoconductor array, and
      a plurality of commutation slits radially extending from a radius slightly smaller than the radius of said photoconductor array to the outer edge of said circular reticle;
   a translating reticle comprising a single slit laterally traversing a path contiguous to and substantially coextensive with said rotating reticle;
   means connecting the output of said photomultiplier to one end of each photoconductor in said array; and means connecting the other end of each photoconductor to an appropriate recoder.

* * * * *